April 5, 1932.  C. KIRCHNER  1,852,209

ELECTRIC TRUCK WITH STEERING AXLES

Filed May 20, 1930

Inventor
Carl Kirchner,
By Henry Orth Jr
atty.

Patented Apr. 5, 1932

1,852,209

UNITED STATES PATENT OFFICE

CARL KIRCHNER, OF BRUNSWICK, GERMANY

ELECTRIC TRUCK WITH STEERING AXLES

Application filed May 20, 1930, Serial No. 454,019, and in Germany April 16, 1927.

The present invention relates to an electric truck with steering axles and particularly resides therein that the motor shaft and the steering axle driven by the motor are freely pivoted about a common axis passing vertically through the point of intersection of the two shafts. Preferably the motor or motors may be mounted on a guide arranged concentrically to the pivotal axis. The motor may be mounted upon a carriage arranged underneath its centre of gravity and which is movable on the guide arranged concentrically to the pivotal axis. The motor can be pivotally arranged on the carriage about a horizontal pivotal bolt and connected to the steering axle by transverse members. The supporting springs may preferably be connected to the truck in such a manner that on turning of the steering axle it is possible for a relative movement to take place between the axle bush and the supporting springs, and preferably also between the supporting springs and the truck. For effecting the connection between the axle bush and the supporting springs and/or between the supporting springs and the truck slide guides may be provided. The slide guide between the truck and the supporting springs may be arranged in the direction of the longitudinal axis of the truck, the slide guide between the axle bush and the steering axle in a direction parallel to the latter axle. The steering axle may be provided with curved guide portions preferably connected to the axle bushes. For supporting the guide portions on the axle bushes rollers may be provided.

In the accompanying drawings the invention is illustrated by way of example.

Figure 1:
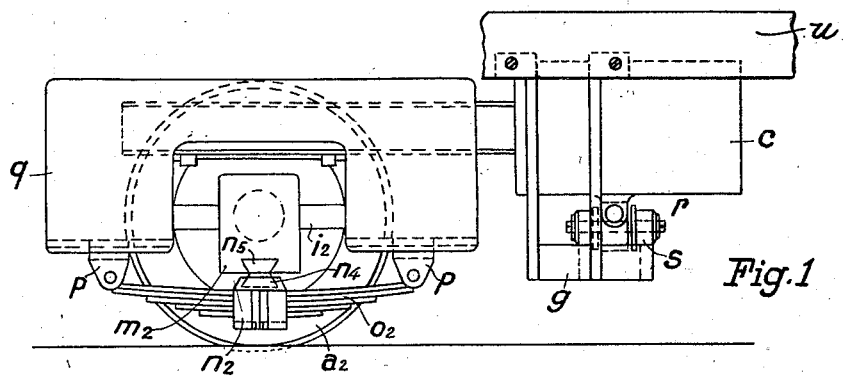
Figure 1 is a side elevation.

In the drawings $a_1$ $a_2$ indicate the track wheels, $b$ a steering axle driven from a motor $c$ through the medium of a motor shaft $d$ and intermediate gearing, not separately shown, contained within a casing $f$. $g$ is a guide on which the motor can be swung about an axis passing at right angles through the point of intersection of the axis of the motor shaft $d$ and the axis of the steering axle $b$. The steering axle $b$ with its wheels and also the transverse members $h_1$ $h_2$ connecting it to the motor is capable of pivoting together with the motor about the said vertical axis. On the steering axle $b$ there are provided concentrically to the said vertical axis curved guide members $i_1$ $i_2$ which bear against rollers $k_1$ $k_2$. $m_1$ $m_2$ are axle bushes which carry the guide members $i_1$ $i_2$. $n_1$ $n_2$ are divided boxes for the reception of axle bush springs $o_1$ $o_2$. On the divided boxes $n_1$ $n_2$ are provided round pins $n_3$ $n_4$ rigidly connected to dovetailed slides $n_5$ $n_6$. The slides $n_5$ $n_6$ are movable parallel to the direction of the axis on the axle bushes $m_1$ $m_2$. The springs $o_1$ $o_2$ are suspended from shells $p$ which are movable on the underframe $q$, of the vehicle frame, in the longitudinal direction of the truck. The motor $c$ is connected below its centre of gravity by means of a pin $r$ to a carriage $s$ running on the guide $g$. The guide $g$ is carried by the truck body, which is not illustrated, and which rests on the underframe $q$. $t$ is a universal coupling between the motor shaft $d$ and the shaft of the casing $f$.

When rocking the steering axle $b$ it is possible, by reason of the construction described, for the slide $n_5$ secured to the box $n_2$, to move outwardly so that no drag occurs between the box $n_1$ and the axle bushes $n_2$ $m_2$. When compressing the springs $o_2$ and rocking the steering axle $b$ the slides $p$ move in their guide on the under-frame $q$. The motor $c$ swings with the axle $b$. The guide members $i_1$ $i_2$ roll on the rollers $k_1$ $k^2$.

Figure 2:
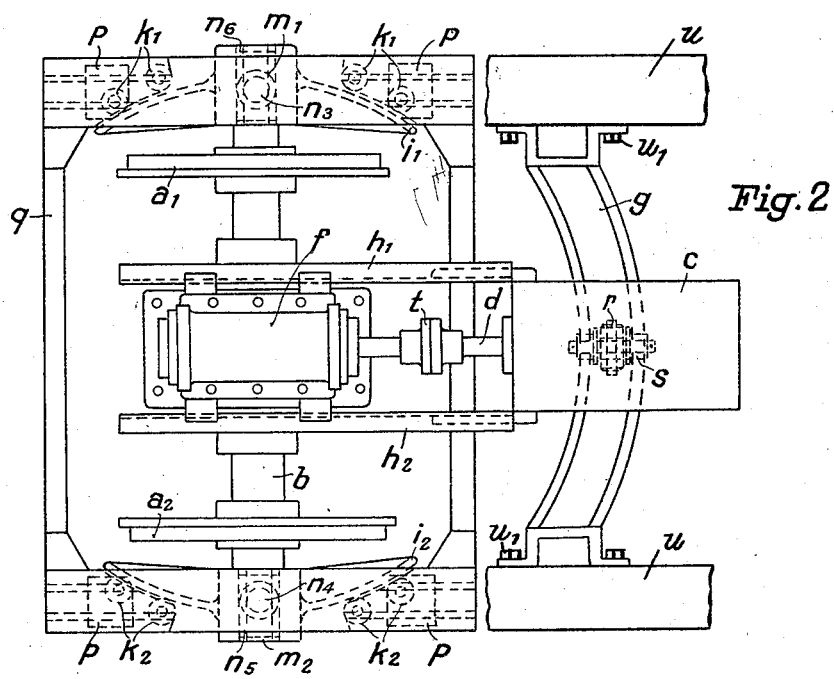
Figure 2 is a plan.
Figure 3:
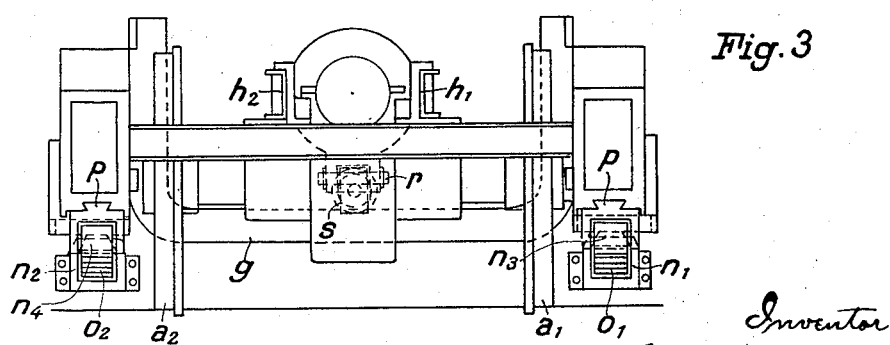
Figure 3 is a front elevation of a device according to the invention.

The guide member $g$ is attached, as indicated in Figs. 1 and 2, to the longitudinally extending bracing members $u$ of the vehicle frame by means of screws $u_1$.

I claim:—

1. In an electric railway truck a freely movable steering axle, a motor, a motor shaft for driving said steering axle, a non-resilient connection between the steering axle and the motor casing, so that the motor casing moves freely with the steering axle, and a guide for carrying the motor, said guide being concentrically curved about an axis passing vertically through the middle of the steering axle.

2. In an electric railway truck a freely movable steering axle, a motor, a motor shaft for driving said steering axle, a non-resilient connection between the steering axle and the motor casing, so that the motor casing moves freely with the steering axle, a guide for carrying the motor, said guide being concentrically curved about an axis passing vertically through the middle of the steering axle, and a roller device between the guide and the motor casing.

3. In an electric railway truck a freely movable steering axle, a motor, a motor shaft for driving said steering axle, a non-resilient connection between the steering axle and the motor casing, so that the motor casing moves freely with the steering axle, a guide for carrying the motor, said guide being concentrically curved about an axis passing vertically through the middle of the steering axle, and a roller device between the guide and the motor casing, which is located below the centre of gravity of the motor casing.

4. In an electric railway truck a freely movable steering axle, a motor, a motor shaft for driving said steering axle, a non-resilient connection between the steering axle and the motor casing, so that the motor casing moves freely with the steering axle, a guide secured to the vehicle body for carrying the motor, said guide being concentrically curved about an axis passing vertically through the middle of the steering axle, whereby the motor and the motor shaft, are non-rigidly connected to the said guide in such a manner, that the motor and motor shaft can yield relatively to differences in height between the guide and the steering axle.

5. In an electric railway truck a freely movable steering axle, a motor, a motor shaft for driving said steering axle, a non-resilient connection between the steering axle and the motor casing, so that the motor casing moves freely with the steering axle, a guide secured to the vehicle body for carrying the motor, said guide being concentrically curved about an axis passing vertically through the middle of the steering axle, whereby the motor and motor shaft are capable of being connected to the guide with the interposition of a horizontal shaft in such a manner, that the motor and motor shaft can yield relatively to differences in height between the guide and the steering axle.

6. In an electric railway truck, a freely movable steering axle, a motor, a motor shaft for driving said steering axle, a non-resilient connection between the steering axle and the motor casing, so that the motor casing moves freely with the steering axle, axle bushes on the steering axle, a vehicle frame, supporting springs arranged one between each of the axle bushes and the vehicle frame, a first guiding means on the vehicle frame for said supporting springs, and a second guiding means on the axle bushes for said supporting springs in such a manner, that when the steering axle is turned no transverse strain is exerted on the spring by the steering axle and the truck.

7. In an electric railway truck a freely movable steering axle, a motor, a motor shaft for driving said steering axle, a non-resilient connection between the steering axle and the motor casing, so that the motor casing moves freely with the steering axle, axle bushes on the steering axle, a vehicle frame, supporting springs arranged one between each axle bush and the vehicle frame and a slide guide on one of the supporting springs, on the vehicle frame, and on one of the axle bushes in such a manner that when the steering axle turns no transverse strain is transmitted to the spring by the steering axle and the truck.

8. In an electric railway truck a freely movable steering axle, a motor, a motor shaft for driving said steering axle, a non-resilient connection between the steering axle and the motor casing, so that the motor casing moves freely with the steering axle, axle bushes on the steering axle, a vehicle frame, a plurality of supporting springs arranged one between each of the axle bushes and the vehicle frame, a slide guide between one of the supporting springs and the vehicle frame, said slide guide being movable parallel to the direction of the longitudinal axis of the vehicle, and a slide guide between the axle bushes and the steering axle, said slide guide being movable parallel to the steering axle.

9. In an electric railway truck a freely movable steering axle, a motor, a motor shaft perpendicular to the steering axle for driving the said steering axle, a wheel radially mounted on said steering axle, on the outside of said wheel a bearing for said steering axle, and a non-resilient connection between the steering axle and the motor casing, so that the motor casing moves freely with the steering axle.

10. In an electric railway truck a freely movable steering axle, a motor, a motor shaft for driving said steering axle, a non-resilient connection between the steering axle and the motor casing, so that the motor casing moves freely with the steering axle, and curved guide members at the ends of said steering axle, said guide members permitting of a rocking movement of the steering axle solely in a substantially horizontal direction about an axis through the middle of said steering axle.

11. In an electric railway truck a steering axle, axle bushes on said steering axle, a vehicle frame, a plurality of supporting springs arranged one between each of the axle bushes and the vehicle frame, a slide guide between one of the supporting springs and the vehicle frame, said slide guide being movable parallel to the direction of the longitudinal axis of the vehicle, and a slide guide between the axle bushes and the steering axle, said slide guide being movable parallel to the steering axle.

12. In an electric truck a steering axle, curved guide members at the ends of said steering axle, said guide members permitting of a rocking movement of the steering axle solely in a substantially horizontal direction about an axis through the middle of said steering axle and rollers on the truck on which the said guide members are movable.

In testimony whereof I affix my signature.

CARL KIRCHNER.